United States Patent
S

(10) Patent No.: US 11,514,122 B1
(45) Date of Patent: Nov. 29, 2022

(54) SOURCING OF RECENTLY CREATED SUPPLEMENTAL CONTENT FOR USER INTERFACES

(71) Applicant: Amazon Technologies, Inc., Seattle, WA (US)

(72) Inventor: Prasad V S, Bangalore (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/087,413

(22) Filed: Nov. 2, 2020

(51) Int. Cl.
*G06F 7/02* (2006.01)
*G06F 16/00* (2019.01)
*G06F 16/9535* (2019.01)
*G06F 16/28* (2019.01)
*G06Q 30/06* (2012.01)
*G06F 16/9538* (2019.01)
*H04L 67/568* (2022.01)

(52) U.S. Cl.
CPC ........ *G06F 16/9535* (2019.01); *G06F 16/285* (2019.01); *G06F 16/9538* (2019.01); *G06Q 30/0627* (2013.01); *G06Q 30/0641* (2013.01); *H04L 67/568* (2022.05); *G06Q 30/0631* (2013.01)

(58) Field of Classification Search
CPC .... G06F 16/9535; G06F 16/285; G06F 16/24; G06F 16/3325; G06F 16/9538; G06Q 30/0627; G06Q 30/0641; G06Q 30/0631; H04L 67/2842
See application file for complete search history.

(56) References Cited

U.S. PATENT DOCUMENTS

| | | | |
|---|---|---|---|
| 6,484,149 B1* | 11/2002 | Jammes | G06Q 30/02 705/26.62 |
| 2011/0238495 A1* | 9/2011 | Kang | G06Q 30/0251 705/14.49 |
| 2012/0226682 A1* | 9/2012 | Li | G06Q 30/06 707/723 |
| 2013/0204857 A1* | 8/2013 | Kartoun | G06F 16/90 707/723 |
| 2018/0246983 A1* | 8/2018 | Rathod | G06F 16/9566 |
| 2021/0149973 A1* | 5/2021 | Gupta | G06F 16/9577 |
| 2021/0398183 A1* | 12/2021 | Jain | G06K 9/627 |

* cited by examiner

*Primary Examiner* — Bruce M Moser
(74) *Attorney, Agent, or Firm* — Thomas | Horstemeyer, LLP

(57) ABSTRACT

Disclosed are various embodiments for identifying and sourcing relevant and recently added or otherwise cold-sourced supplemental content (e.g., advertisements, sponsored item listings, etc.) for consideration to be presented to a user interacting with an electronic commerce system. Supplemental content that is identified as being recently added or cold-sourced is mapped to or otherwise associated with one or more search queries that are determined to correspond to a given item category. When a user interacting with a user interface enters a search query that matches a previously received search query, the supplemental content that has been mapped to the previously received search query is selected and/or otherwise sourced for consideration to be presented in a user interface including the search results.

20 Claims, 8 Drawing Sheets

US 11,514,122 B1

SOURCING OF RECENTLY CREATED SUPPLEMENTAL CONTENT FOR USER INTERFACES

BACKGROUND

Networked systems for item search and navigation typically receive user-defined search criteria from a client device, and then perform a database search in order to generate a result set of items. In some instances, the search results may include additional related content that may be selected to be presented to the user in response to a determination that the additional related content may be of interest to the user.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
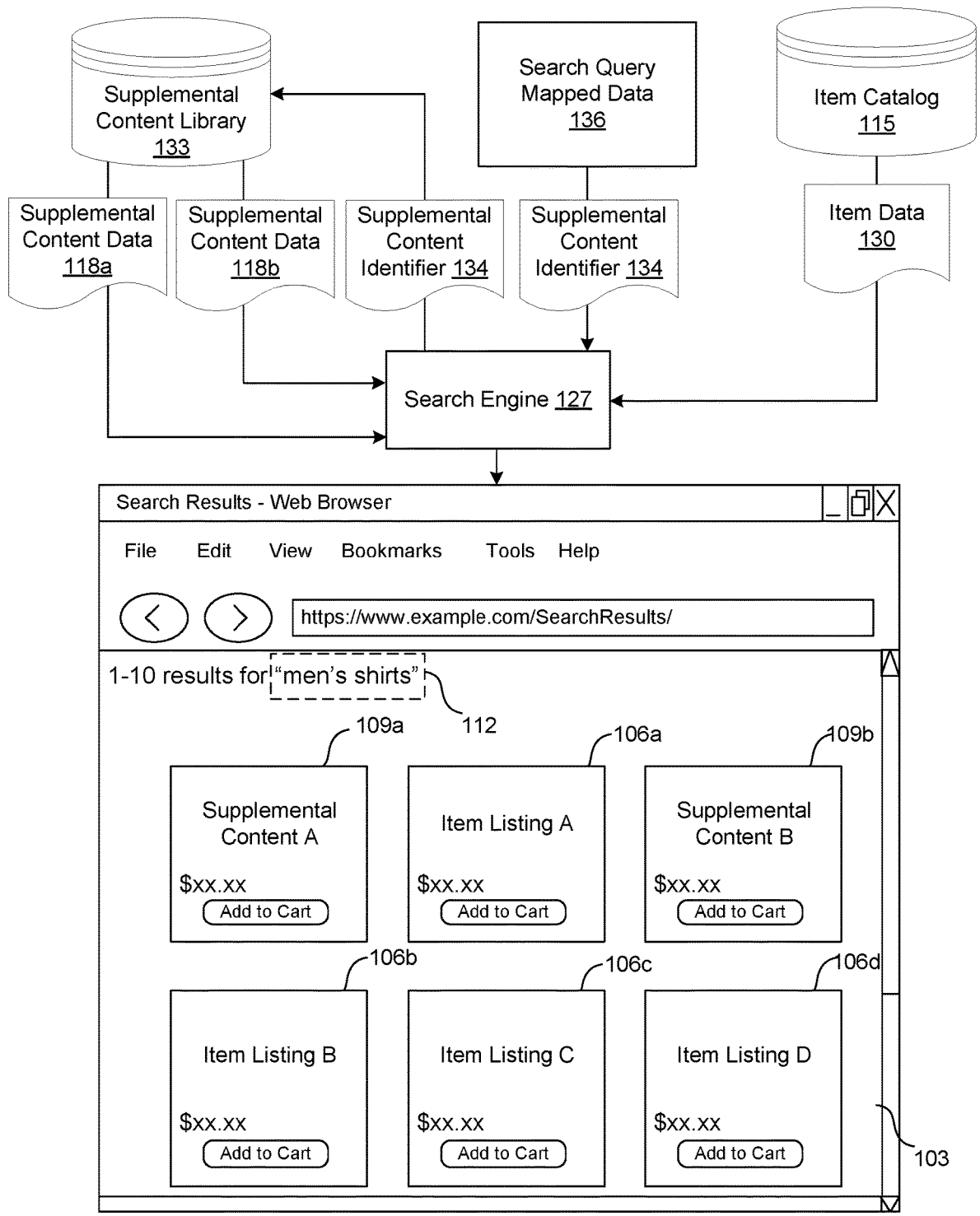
FIG. 1 is a drawing of an example scenario related to the generation of a user interface that includes item listings and supplemental content listings in accordance to various embodiments of the present disclosure.

The present disclosure relates to identifying and sourcing relevant and recently added or otherwise cold-sourced supplemental content (e.g., advertisements, sponsored item listings, etc.) for consideration to be presented to a user interacting with an electronic commerce system. In one or more examples, supplemental content that is identified as being recently added or cold-sourced is mapped to or otherwise associated with one or more search queries that are associated with a given item category. For example, if a given supplemental content relates to an item in the item category for "men's shirts," the supplemental content is mapped to or otherwise associated with any previously entered search queries that have been previously used by users interacting with the electronic commerce system to obtain search results that include items in the men's shirts category. When a user interacting with an electronic commerce system enters a given search query that matches a previously received search query, the supplemental content that has been mapped to the previously received search query is selected and/or otherwise sourced for consideration to be presented in a user interface including the search results.

According to various embodiments, supplemental content includes network content corresponding to a sponsored promotion of one or more items associated with a third-party entity (e.g., merchant) and available via the electronic commerce system. Typically, supplemental content presented to users interacting with the electronic commerce system is sourced or otherwise selected from a supplemental content library using prediction algorithms that rely on historical information. For example, supplemental content that is determined to have a high expectation of user interaction based on prior interactions with the presented supplemental content will likely be included in the original sourcing of the supplemental content. The supplemental content that is sourced using the prediction algorithms is further evaluated and applied through filtering algorithms until the final selection of the supplemental content that is presented to the user is determined to be most applicable for the user, given the particular interaction experience.

For example, a third-party entity (e.g., advertiser) may place a value on certain characteristics in order to target supplemental content (e.g., advertisements) toward users having those characteristics. Content providers may present to the user the supplemental content having the highest value given the characteristics of the user. However, due to a lack of historical data, recently added supplemental content that is stored in a supplemental content library or database may never be selected for consideration to be presented even if the recently added supplemental content would actually have a value to the user and would typically be selected for presentation. Therefore, it is beneficial to identify relevant and recently added supplemental content that would typically not be selected using the traditional prediction algorithms to improve the amount of supplemental content that is originally sourced and to ensure that relevant and recently added supplemental content is considered for selection.

Turning now to FIG. 1, shown is an example scenario 100 related to the generation of an example user interface 103 that includes item listings 106 (e.g., 106a, 106b, 106c, 106d) and supplemental content listings 109 (e.g., 109a, 109b) in accordance to various embodiments of the present disclosure. In the example of FIG. 1, the user interface 103 corresponds to a search results page and the item listings 106 correspond to items (e.g., products, goods, services, digital content, etc.) in an electronic item catalog 115 that match the search query 112 and other search criteria.

According to various embodiments, an item listing 106 comprises at least one of an item image, an item price, an add-to-cart component, a one-click purchase component (not shown), a select quantity component, an item name, and/or other item attributes or selectable components as can be appreciated. In some examples, the item listings 106 comprise a selectable region, that in response to user interaction (e.g., selection, hover action, etc.), is configured to redirect the user to a user interface that provides additional information about the given product. In some examples, a user interaction with the selectable region generates a pop-up box or other user interface element (e.g., drop down box, inline expansion component, etc.) that is generated and presented to the user with additional information about the item without redirecting the user to a different network page or other user interface 103.

The supplemental content listings 109 correspond to advertisements and/or promotions of one or more items available through an electronic commerce system. According to one or more examples, the supplemental content listings 109 include sponsored content that is presented to the user to promote or otherwise recommend a particular item that is available via the electronic commerce system. According to various embodiments, the supplemental content listings 109 are selected for inclusion in the user interface 103 according to one or more factors. In one or more examples, the factors include at least one of a likelihood a user will interact with the supplemental content listing 109, a relevance between the supplemental content and a search query 112, a category data of the supplemental content, supplemental content data 118, user preference data, user historical data, agreements between the supplemental content entity and the content provider (e.g., electronic commerce system), and/or other factors as can be appreciated.

In some embodiments, the supplemental content listing 109 is configured similarly to that of an item listing 106. For example, in various embodiments, a supplemental content listing 109 comprises at least one of an item image, an item price, an add-to-cart component, a one-click purchase component (not shown), a select quantity component, an item name, and/or other item attribute or selectable component as can be appreciated. In some embodiments, a supplemental content listing 109 comprises a selectable region, that in response to user interaction (e.g., selection, hover action, etc.), redirects the user to a user interface that provides additional information about the given item. In some examples, a user interaction with the selectable region of the supplemental content listing 109 generates a pop-up box or other user interface element (e.g., drop down box, inline expansion component, etc.) that can be generated and presented to the user with additional information about the item without redirecting the user to a different network page or other user interface 103.

According to one or more examples, in response to receiving a search query 112 from a client device 121 (FIG. 3) interacting with an electronic commerce application 124 (FIG. 3), a search engine 127 analyzes item data 130 retrieved from an item catalog 115 to select the item listings 106 to include in the search results. In various embodiments, the search engine 127 further analyzes supplemental content data 118 (e.g., 118a, 118b) to select the supplemental content listings 109 that are to be included in the user interface 103 providing the search results.

In various examples, third-party entities (e.g., advertisers) define and request inclusion of supplemental content (e.g., advertisement) into user interfaces 103 associated with an electronic commerce application 124. Supplemental content data 118 associated with the supplemental content is be generated and stored in a supplemental content library 133. The supplemental content data 118 can comprise supplemental content listing data, a supplemental content identifier, one or more item categories associated with the supplemental content, a supplemental content entity promoting the supplemental content, a date of creation, a date of expiration, and/or other supplemental content data.

According to various embodiments, the search engine 127 selects supplemental content data 118a from the supplemental content library 133 using prediction algorithms that rely on historical information. However, as previously discussed, the supplemental content selected using the prediction algorithms may fail to include recently added or cold-sourced supplemental content as there is no history with regard to an expectation of behavior (e.g., user interactions) with the given supplemental content. As such, the recently added or cold-sourced supplemental content is not given the opportunity for consideration for placement in the search results.

According to various embodiments, the search engine 127 retrieves supplemental content identifiers 134 corresponding to recently added or cold-sourced supplemental content from search query mapped data 136 for consideration to be included in the search results based on the submitted search query 112. In one or more examples, the search engine 127 uses the retrieved supplemental content identifiers 134 that are mapped to a given search query 112 to obtain the corresponding supplemental content data 118b from the supplemental content library 133. Accordingly, the search engine 127 is able to source supplemental content that includes relevant and recently added supplemental content that would otherwise not likely be included in the original retrieval of supplemental content data 118a from the supplemental content library 133.

Figure 2:
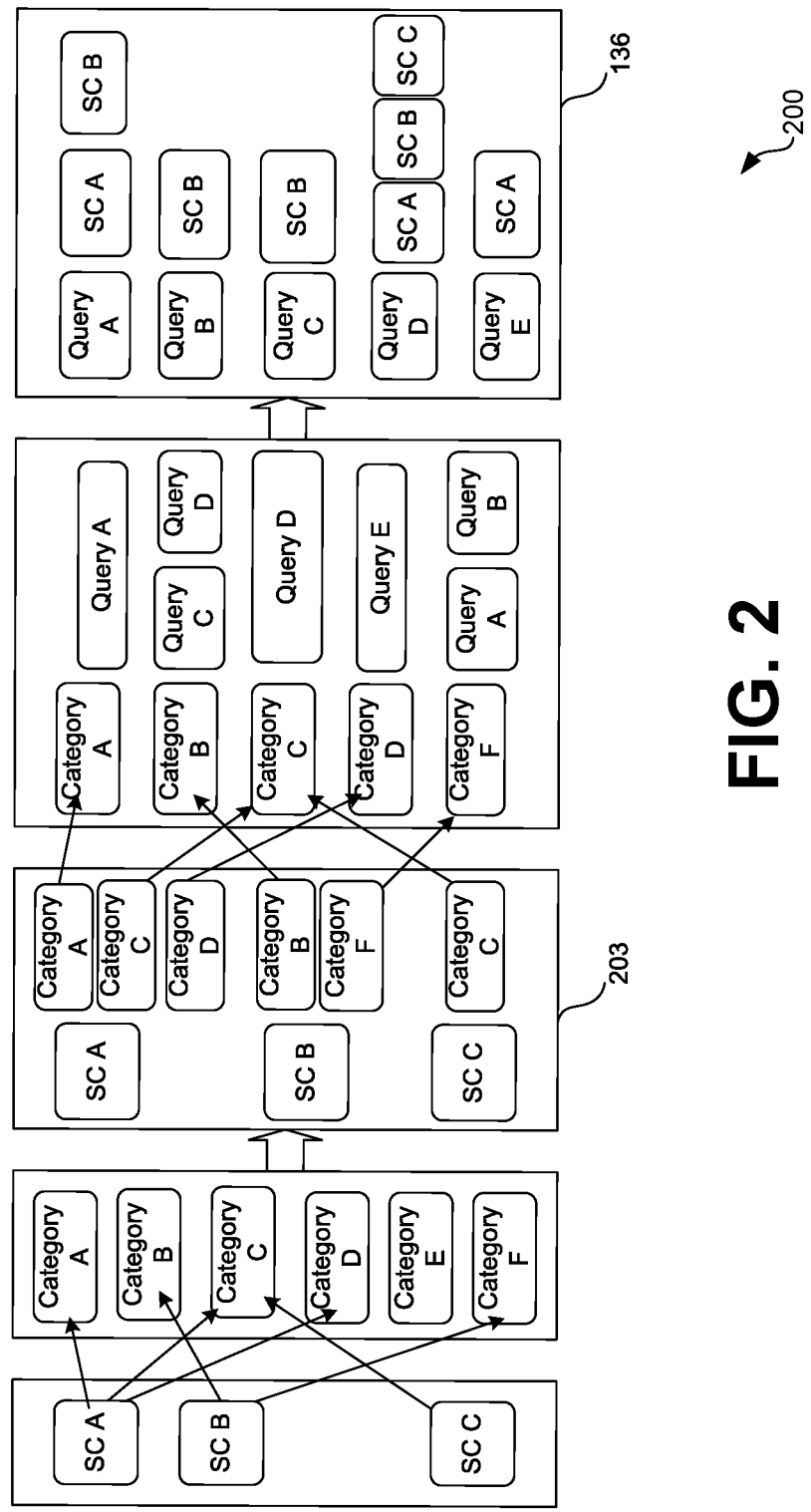
FIG. 2 illustrates an example diagram illustrating a sequence of steps related to the building of the supplemental content search query mapping data in accordance to various embodiments of the present disclosure.

FIG. 2 illustrates an example diagram 200 illustrating a sequence of steps related to the building of the search query mapped data 136 which improves the amount of supplemental content that is originally sourced and ensures that relevant and recently added supplemental content is sourced and considered for presenting to a user interacting with the electronic commerce application 124.

To begin, in order to provide the recently added or cold-sourced supplemental content, the recently added or cold-sourced supplemental content stored in the supplemental content library 133 is first identified from the supplemental content library 133 using one or more selection factors. According to various embodiments, the selection factors comprise at least one of a date of creation of the supplemental content, an amount of interaction history data associated with a given supplemental content, and/or other factors. The recency associated with the supplemental content is based on a predefined period of time (e.g., week, year, day, hour, etc.) that is relative to a current time. For example, if the time period corresponds to a week from the current date, all of the supplemental content in the supplemental content library 133 that has a date of creation within the last week will be identified as being recently added supplemental content. In the example of FIG. 2, supplemental content "SC A," "SC B," and "SC C" have all been identified as corresponding to recently-added or cold-sourced supplemental content.

The supplemental content data 118 corresponding to each supplemental content identified as being recently added or cold-sourced supplemental content includes an identification of one or more item categories associated with the supplemental content. For example, as shown in FIG. 2, the supplemental content "SC A" is determined to be associated with Item Category A, Category C and Item Category D while the supplemental content "SC B is" determined to be associated with Item Category B and Item Category F.

In some examples, the one or more item categories are identified according to keywords associated with the given supplemental content. For example, during the onboarding process, an entity associated with the supplemental content may define keywords corresponding attributes of an item associated with the supplemental content. In other examples, item attributes of the item associated with the supplemental content can be defined in an item category and used as keywords associated with the supplemental content. According to various examples, the keywords can be used to identify the one or more categories. For example, assume a given supplemental content is associated with a book about World War II. The keywords associated with the supplemental content may include, for example, "history," "war,"

"world war II." In some examples, the keywords may directly correlate with a given item category and/or item subcategory. In some examples, the keywords are synonymous to a keywords or attributes of a given item category (e.g., floral dress vs. flowery dress). In other examples, learned models may be used to identify a given item category based at least in part on a combination of one or more of the keywords.

Upon determining the items in categories that are associated with each of the identified recently added supplemental content, a supplemental content (SC)-to-item category mapping 203 is created. In one or more examples, the supplemental content identifiers 134 associated with the supplemental content can be mapped to or otherwise associated with the item categories.

Once the SC-to-item category mapping 203 is created, search queries 112 associated with each of the item categories included in the SC-to-item category mapping 203 are identified. In one or more examples, the item data 130 associated with the items in the item catalog 115 includes a history of search queries 112 that have been used to generate search results including items corresponding to the given item category. For example, the item category for "hardback mystery books" may be associated with a search query 112 comprising "mystery books with a hard cover." In one embodiment, an electronic commerce system includes an ever changing list of phrases, keywords, brand names etc. that are mapped to particular item categories. As such, the search queries 112 associated with a given item category are identified. In some examples, a subset of the associated search queries are selected according to one or more factors, such as, for example, a number of times a given search query has been used for a given item category, a performance associated with the given search query (e.g., Were the search results useful to the one or more users?), and/or other factors. For example, a search query 112 that has been used one hundred times to identify products in a given item category may be considered to be more relevant than a search query 112 that has only been used once to identify products in a given item category.

Upon identifying the search queries 112, the search query mapped data 136 is created by generating a mapping between the search queries 112 and the supplemental content. In one or more examples, the search query mapped data 136 maps the supplemental content identifier 134 for a given supplemental content with the search queries 112 that are determined to be relevant with regard to an item category associated with the supplemental content. In various examples, the search query mapped data 136 includes a table that is used to associate one or more supplemental content identifiers 134 to a given search query 112. In various examples, the table can be stored in a cache or other type of data store. Accordingly, in response to receiving a search query 112 via interactions with a user interface 103, a matching search query 112 in the search query mapped data 136 is identified. As such, the corresponding supplemental content identifier(s) 134 associated with the matching search query 112 in the search query mapped data 136 is obtained and the corresponding supplemental content data 118 is retrieved from the supplemental content library 133 according to the supplemental content identifiers 134.

This process allows for relevant and recently added supplemental content that does not have a history to be sourced through traditional methods to be sourced and considered for selection. According to various embodiments, the search query mapped data 136 is stored in a cache to provide faster access and identification of the relevant supplemental content that is included in the search query mapped data 139. In some examples, the cache is online. In other examples, the cache is offline.

As one skilled in the art will appreciate in light of this disclosure, certain embodiments may be capable of achieving certain advantages, including some or all of the following: (1) reducing computer resource utilization (e.g., memory consumption, processor utilization, network transfer, etc.) by providing relevant information to users to reduce additional searching and use of computer resources by the user to identify the items of interest; (2) reducing computer resource utilization (e.g., memory consumption, processor utilization, network transfer, etc.) by storing the search query mapped data 136 in a cache to allow quick access and identification to recently added supplemental content; (3) improving the functioning of the computing system through a more streamlined purchasing process that reduces user frustration when searching for other items; and so forth. In the following discussion, a general description of the system and its components is provided, followed by a discussion of the operation of the same.

Figure 3:
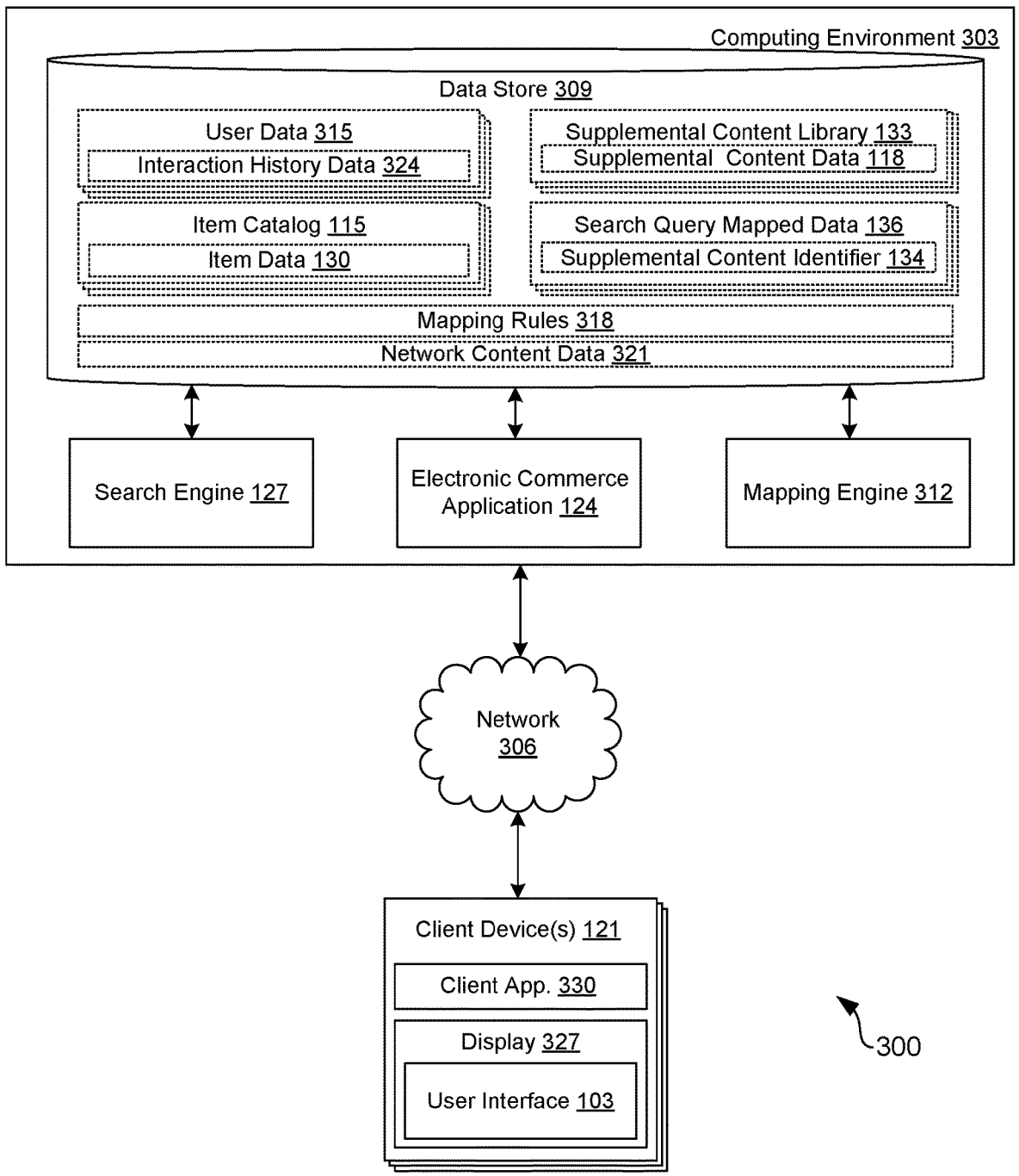
FIG. 3 is a schematic block diagram of a networked environment according to various embodiments of the present disclosure.

With reference to FIG. 3, shown is a networked environment 300 according to various embodiments. The networked environment 300 includes a computing environment 303 and one or more client devices 121, which are in data communication with each other via a network 306. The network 306 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 303 may comprise, for example, a server computer or any other system providing computing capability. Alternatively, the computing environment 303 may employ a plurality of computing devices that may be arranged, for example, in one or more server banks or computer banks or other arrangements. Such computing devices may be located in a single installation or may be distributed among many different geographical locations. For example, the computing environment 303 may include a plurality of computing devices that together may comprise a hosted computing resource, a grid computing resource, and/or any other distributed computing arrangement. In some cases, the computing environment 303 may correspond to an elastic computing resource where the allotted capacity of processing, network, storage, or other computing-related resources may vary over time.

Various applications and/or other functionality may be executed in the computing environment 303 according to various embodiments. Also, various data is stored in a data store 309 that is accessible to the computing environment 303. In one or more examples, the data store 309 is representative of a plurality of data stores 309 as can be appreciated. The data stored in the data store 309, for example, is associated with the operation of the various applications and/or functional entities described below.

The components executed on the computing environment 303, for example, include an electronic commerce application 124, a search engine 127, a mapping engine 312, and other applications, services, processes, systems, engines, or functionality not discussed in detail herein.

The electronic commerce application 124 is executed to facilitate the online sale, download, lease, rent, etc. of items from one or more electronic commerce systems over the network 306. Such items may include products, goods, services, digital content, and/or other items. The electronic commerce application 124 also performs various backend functions associated with the online presence of an electronic commerce system in order to facilitate the online purchase of items. For example, the electronic commerce application 124 generates network pages such as, for example, web pages and/or other types of network content that are provided to client devices 121 for the purposes of promoting and selecting items for purchase, rental, download, lease, or any other forms of consumption.

The search engine 127 is executed to perform a search upon an item catalog 115 using a search query 112 and return a set of search results. The search results may be ranked according to relevance, date, popularity, price, size, and/or other factors. The search engine 127 may also select the search results based at least in part on user profile characteristics (e.g., user purchase history, user query history, user browse history, user demographic data, etc.), client device characteristics (e.g., client location, device type, browser type, etc.), and/or other data. Non-limiting examples of searches that may be performed via the search engine 127 may include product searches, service searches, image searches, music searches, video searches, a data search within a hosted computing resource, and/or other searches.

In addition, the search engine 127 is executed to source and select supplemental content that is presented in addition to the search results (e.g. item listings 106). In particular, the search engine 127 retrieves supplemental content data 118a from the supplemental content library 133 in accordance to various relevance algorithms and historical data. In addition, the search engine 127 can access the search query mapped data 136 to identify relevant and recently added supplemental content identifiers 134 that are mapped to a search query 112 that matches the received search query 112 that prompted the original search. Upon identifying the supplemental content identifiers 134 that are determined to be relevant, the search engine 127 obtains the supplemental content data 118b from the supplemental content library that are associated with the supplemental content identifiers 134. Upon sourcing the supplemental content data 118 from the supplemental content library 133, the search engine 127 applies one or more additional relevance algorithms to select the supplemental content that is to be included in the search results page to supplement the search results.

The mapping engine 312 is executed to generate the search query mapped data 136. In particular, the mapping engine 312 identifies and selects the recently added and/or cold-sourced supplemental content and generates a SC-to-item category mapping 203 that associates the recently added and/or cold-sourced supplemental content with one or more item categories. For example, upon identifying a given supplemental content, the mapping engine 312 identifies one or more categories associated with the supplemental content. In various examples, the mapping engine 312 identifies the one or more item categories based at least in part on keywords included in the supplemental content data, item attributes of an item associated with the supplemental content, and/or other factors.

The mapping engine 312 further uses the SC-to-item category mapping 203 to identify search queries 112 that are considered relevant to a given item category and to generate the search query mapped data 136 by mapping the identified search queries 112 to the identified supplemental content. In various examples, search results or identified items from an item catalog may be sourced from a given item category in response to a given search query 112. As search queries are received and search results are provided over time in response to interactions with the electronic commerce application 124, a list of search queries 112 may be associated with the different item categories corresponding to the sourcing location (e.g., item categories) for obtaining the search results and/or identifying the corresponding products. This association can be used to identify search queries 112 that can be used to generate the search query mapped data 136. For example, the search queries 112 are mapped to the supplemental content identifiers 134 that are determined to correspond to the associated item categories.

In various examples, the mapping engine 312 updates the search query mapped data 136 to replace any invalid supplemental content (e.g., removed content, no longer considered recent, or has been sourced a number of times that meets or exceeds a threshold, etc.) and/or invalid search queries 112 (e.g., no longer relevant for a given item category). The mapping engine 312 further stores the search query mapped data 136 in the data store 309. In some examples, the search query mapped data 136 is stored in an online data cache or an offline data cache.

The data stored in the data store 309 includes, for example, user data 315, an item catalog 115, a supplemental content library 133, search query mapped data 136, mapping rules 318, network content data 321, and potentially other data.

The user data 315 includes various data collected from or generated by users and/or customers having accounts in an electronic commerce site facilitated by the electronic commerce application 124. In various embodiments, the user data 315 includes interaction history data 324, preference data, account address(es), payment instrument data, authentication information, and/or other data associated with a user or user account of the electronic commerce site.

The interaction history data 324 may include information specific to a user account such as, for example, a purchase history (including purchase frequency, purchase cadence, purchase recency, etc.), a browsing history, a viewing history, a rating history, a search history, and/or other information that reflects a prior interaction by the user account with the computing environment 303.

The item catalog 115 includes item data 130 regarding items offered through the electronic commerce application 124. Such items include, for example, products, goods, services, digital content, and/or other items that can be offered for sale, lease, rent, download, etc. In various embodiments, the items in the item catalog 115 are organized according to a taxonomy of categories. For example, the items in the item catalog 115 may be categorized according to an item type with various item attributes further defining a placement of an item in the taxonomy. For example, "subjects" and "formats" can include two branches of the taxonomy under a category for "books." Further, the category associated with "subjects," for example, may further include branches according to type (e.g., mystery, science, etc.) and/or other attributes.

The item data 130 may include item attributes, an item identifier, descriptions, weights, prices, quantities available, export restrictions, customer reviews, customer ratings, images, videos, version information, availability information, shipping information, related search queries 112 and/or other data. Item attributes can include specific characteristics that define a given item. For example, item attributes can include size, color, weight, packaging, quantity, freshness, ripeness, nutritional values, how the item is processed, brand, seasonality (e.g., fall, winter, spring, summer, holidays, etc.), associated activities (e.g., celebration, weddings, picnics, sporting events, etc.), hazardous classification, fragility, import/export restrictions, and/or other attributes as can be appreciated.

The supplemental content library 133 includes supplemental content data 118 corresponding to supplemental content that may be included in user interfaces associated with the electronic commerce application 124. Various forms of supplemental content include, for example, advertisements for external network sites, sponsored search result listings, recommendations for similar products, advertisements for merchants local to the user, and/or other supplemental content. According to various examples, third-party entities (e.g., merchants) define supplemental content data 118 that is used to generate the supplemental content (e.g., supplemental content listing 109) through interactions with a user interface 103. For example, the user interface 103 allows the third-party entity to define the supplemental content listing 109, one or more related item categories, one or more attributes that define the attributes of users that the supplemental content should be presented to, item data 130 associated with the supplemental content, and/or other data as can be appreciated.

The search query mapped data 136 includes a mapping of search queries 112 with supplemental content identifiers 134 such that the supplemental content identifiers 134 can be used to identify relevant and recently added supplemental content that corresponds to a given search query 112. In some examples, the search query mapped data 136 is stored in an online data cache or an offline data cache.

The mapping rules 318 include rules, models, and/or configuration data for the various algorithms or approaches employed by the mapping engine 312. In various examples, the mapping rules 318 include the various models and/or algorithms for identifying the supplemental content in the supplemental content library 133 that is considered to be relevant and/or cold-sourced supplemental content. In some examples, the mapping rules 318 include a predefined recently added threshold that defines the date range for determining whether a given supplemental content is recently added. In other examples, the mapping rules 318 include a cold-sourced threshold which indicates a threshold related to a number of times that a supplemental content has been previously selected in the original sourcing of the supplemental content from the supplemental content library 133.

The mapping rules 318 further include various rules, models, and/or algorithms for determining the item categories that are associated with the supplemental content. According to various embodiment, the mapping engine 312 uses the mapping rules 318 to identify one or more categories based on the defined keywords included in the supplemental content data 118. For example, the mapping rules 312 can include models that are trained to identify one or more item categories based at least in part on one or a combination of keywords included in the supplemental content data 118 and/or other factors associated with the supplemental content (e.g., item, item attributes, associated entity, etc.). In this example, the keywords for "history" and "hardback" may be used as inputs into a model that is trained to identify the item category of "historical books." In other examples, the mapping rules 318 may comprises one or more threshold values that can be used to determine whether a given keyword is synonymous to a given item attribute and/or item category.

In other examples, the mapping rules 318 can be used to eliminate certain item categories from consideration. For example, assume a keyword associated with the supplemental content identifies Brand A. Further, assume that Brand B is defined in the mapping rules 318 as being a competitor to Brand A. Therefore, based on the mapping rules 318, the mapping engine 312 can determine to exclude all item categories associated with Brand B for the given supplemental content.

In various embodiments, the mapping rules 318 are used by the mapping engine 312 in determining a relevancy of item categories. For example, while the supplemental content data 118 defines keywords that correspond to one or more item categories that are related to the supplemental content, some of the item categories may be considered to be more relevant than other item categories. In one or more examples, the items in the item catalog 115 may be categorized according to an item type with various item attributes further defining a placement of an item in the taxonomy. In various examples, the more relevant item category corresponds to an item category having the longest path from the root item category in accordance with the taxonomy. For example, for supplemental content data 118 associated with a floral women's tank, item categories determined for the supplemental content data 118 may include item categories for "women's clothes," "floral," and "women's tops." However, the "floral" category may branch from "women's tops" which branches from "women's clothes". As such, the path for "floral" may be longer and therefore more relevant than the item categories "women's tops" and "women's clothes."

The mapping rules 318 further include models and algorithms for selecting search queries that should be mapped to the supplemental content. In one or more examples, the mapping rules 318 define a search query threshold. In various examples, a search query 112 is added to the search query mapped data 136 when a number of times the search query 112 has been used with respect to the given item category meets or exceeds the search query threshold.

The network content data 321 include various data employed by the electronic commerce application 124 and/or the search engine 127 in generating user interfaces 103, and/or other network pages. The network content data 321 may include hypertext markup language (HTML), extensible markup language (XML), cascading style sheets (CSS), images, text, audio, video, templates, and/or other data.

The client device 121 is representative of a plurality of client devices that may be coupled to the network 306. The client device 121 comprises a processor-based system such as, for example, a computer system. In various examples, the computer system is embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 121 may include a display 327. The display 327 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 121 may be configured to execute various applications such as a client application 330 and/or other applications. In various examples, the client application 330 is executed in a client device 121, for example, to access network content served up by the computing environment 303 and/or other servers, thereby rendering a user interface 103 on the display 327. To this end, the client application 330 may comprise, for example, a browser, a dedicated application, etc., and the user interface 103 may comprise a network page, an application screen, etc. The client device 121 may be configured to execute applications beyond the client application 330 such as, for example, email applications, social networking applications, word processors, spreadsheets, and/or other applications.

Next, a general description of the operation of the various components of the networked environment 300 is provided with reference to FIGS. 4-7.

Figure 4:
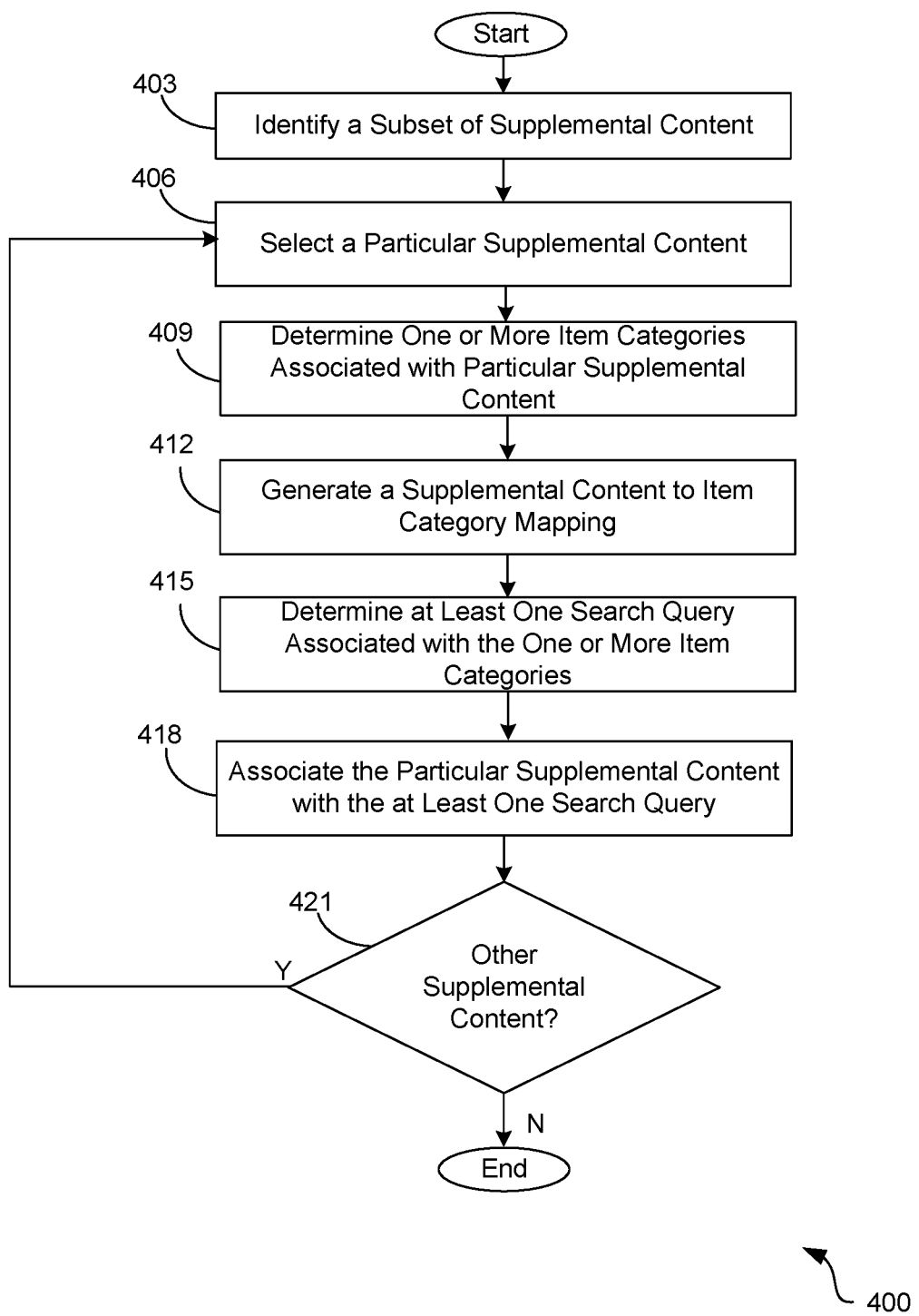
FIGS. 4-7 are flowcharts illustrating examples of functionality implemented as portions of the electronic commerce application, the search engine, and/or the mapping engine executed in a computing environment in the networked environment of FIG. 3 according to various embodiments of the present disclosure.

To begin, FIG. 4 illustrates a flowchart 400 that provides one example of the operation of a portion of the mapping engine 312 (FIG. 3) according to various embodiments. It is understood that the flowchart of FIG. 4 provides merely an example of the many different types of functional arrangements that may be employed to implement the operation of the portion of the mapping engine 312 as described herein. As an alternative, the flowchart of FIG. 4 may be viewed as depicting an example of elements of a method implemented in the computing environment 303 (FIG. 3) according to one or more embodiments.

Beginning with box 403, the mapping engine 312 identifies a subset of supplemental content from the supplemental content library 133. The subset of supplemental content corresponds to recently added and/or cold-sourced supplemental content. According to various embodiments, the subset of supplemental content is identified or otherwise selected from the supplemental content library 133 based at least in part on one or more selection factors. In various examples, the one or more selection factors comprise at least one of a date of creation of the supplemental content, an amount of interaction history data associated with a given supplemental content, and/or other factors. The recency associated with the supplemental content is based on a predefined period of time (e.g., week, year, day, hour, etc.). For example, if the predefined period of time is a week from DATE A, all of the supplemental content in the supplemental content library 133 that has a date of creation on or after DATE A will be identified as being recently added supplemental content. In other examples, supplemental content is considered to be cold-sourced if the supplemental content has not been sourced (e.g., considered for selection for display on a user interface 103) a predetermined threshold number of times.

At box 406, the mapping engine 312 selects a particular supplemental content from the subset of particular content. In one or more examples, the particular supplemental content is selected according to a supplemental content identifier 134, a name, an order of identification, and/or other factors as can be appreciated.

At box 409, the mapping engine 312 determines one or more item categories associated with the particular supplemental content. In some examples, the one or more item categories are based on the item categories defined in the supplemental content data 118 corresponding to the particular supplemental content. In some examples, the one or more item categories are defined by a third-party entity associated with the supplemental content. In other examples, the one or more item categories are determined based on an item associated with the supplemental content and the corresponding item data 130 for the item that defines the item categories.

In some examples, the mapping engine 312 determines the item categories based at least in part on a relevancy of the one or more item categories that are determined to be associated with the supplemental content. For example, while the supplemental content data 118 defines item categories that are related to the supplemental content, some of the item categories may be considered to be more relevant than other item categories. In one or more examples, the items in the item catalog 115 may be categorized according to an item type with various item attributes further defining a placement of an item in the taxonomy. In various examples, the more relevant item category corresponds to an item category having the longest path from the root item category from the taxonomy. For example, for supplemental content data 118 associated with a floral women's tank, item categories determined for the supplemental content data 118 may include item categories for "women's clothes," "floral," and "women's tops." However, the "floral" category may branch from "women's tops" which branches from "women's clothes." As such, the path for "floral" may be longer and therefore more relevant than the item categories "women's tops" and "women's clothes." Accordingly, in various embodiments, the mapping engine 312 determines the one or more item categories according to a length of a given path. In this example, the item category having the longest path is selected. In other examples, item categories having lengths that exceed a predefined threshold are selected.

At box 412, the mapping engine 312 generates a supplemental content (SC)-to-item category mapping 203. In particular, upon identification of the search queries 112 for the one or more item categories, the mapping engine 312 generates the SC-to-item category mapping 203 by mapping or otherwise associating the supplemental content identifiers 134 with the corresponding item categories.

At box 415, the mapping engine 312 determines at least one search query 112 associated with the one or more item categories included in the SC-to-item category mapping 203. In one or more examples, the item data 130 associated with the items in the item catalog 115 include a history of search queries 112 that have been used to generate search results including items corresponding to the given item category. For example, the item category for "hard-back mystery books" may include a search query 112 comprising "mystery books with a hard cover." As such, the search queries 112 associated with a given item category are identified. In some examples, a subset of the associated search queries are selected according to one or more factors, such as, for example, a number of times a given search query has been used for a given item category, a performance associated with the given search query (e.g., Were the search results useful to the one or more users?), and/or other factors. For example, a search query 112 that has been used one hundred times to produce search results in a given item category may be considered to be more relevant than a search query 112 that has only been used once to produce search results in a given item category.

At box 418, the mapping engine associates the particular supplemental content with the at least one search query 112. In various examples, the relationship between the particular supplemental content and the least one search query 112 is determined according to at least the SC-to-item category mapping 203 and the identified search queries 112. The mapping engine 312 associates the particular supplemental content with the at least one search query 112 by generating the search query mapped data 136. The search query mapped data 136 includes a mapping of the particular supplemental content identifier 134 associated with the particular supplemental content to the at least one search query 112. In some examples, if multiple supplemental content is determined to correspond to a given search query 112, the given search query 112 will be mapped to or otherwise associated with the supplemental content identifiers 134 for the multiple supplemental content as shown in FIG. 2.

At box 421, the mapping engine 312 determines if there is additional supplemental content in the subset of supplemental content. If there is additional supplemental content, the mapping engine 312 returns to box 406. Otherwise, this portion of process proceeds to completion.

Figure 5:
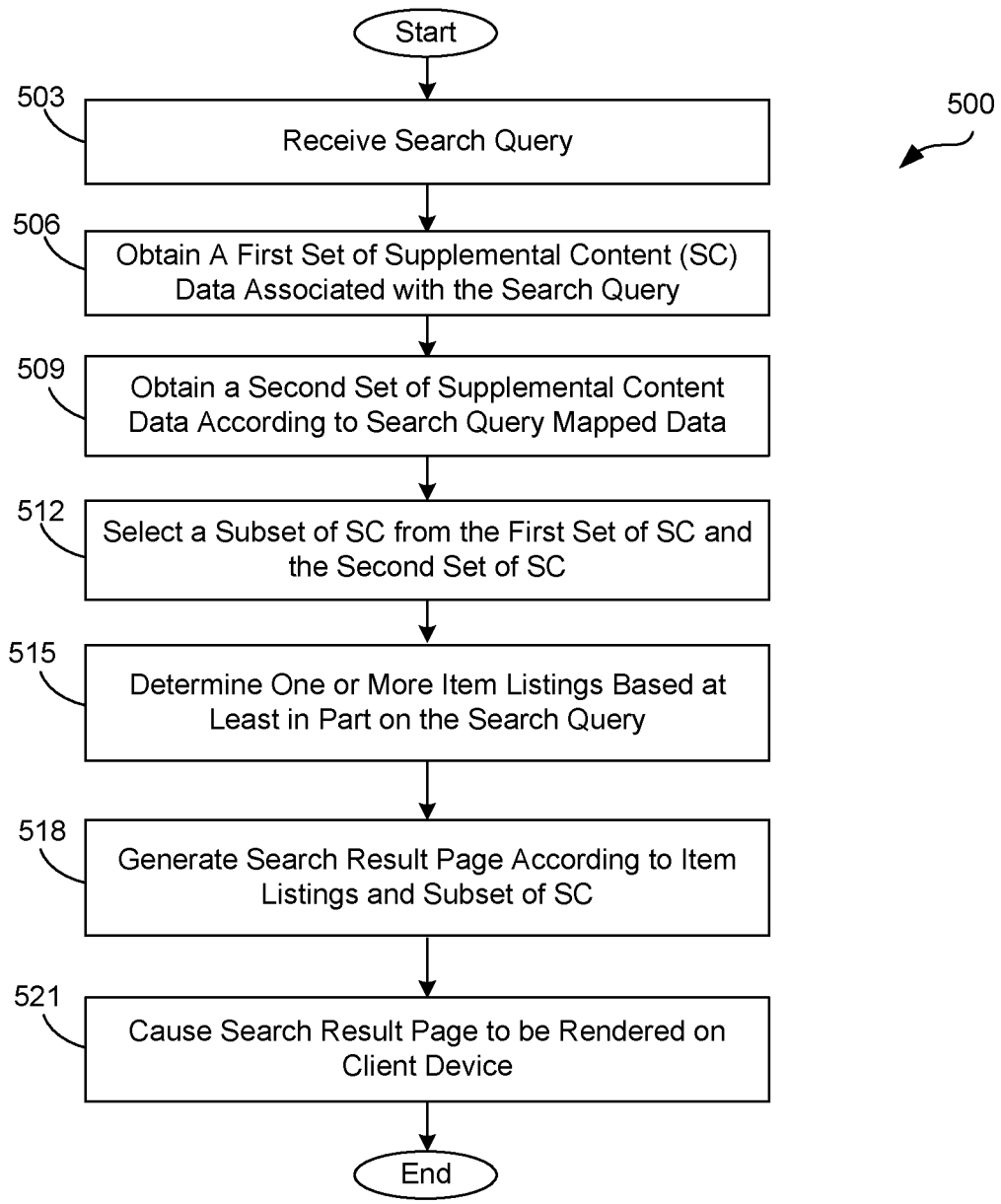

Turning now to FIG. 5, shown is a flowchart 500 that provides one example of the operation of portions of the search engine 127 and/or the electronic commerce application 124 according to various embodiments. It is understood that the flowchart of FIG. 5 provides merely an example of the many different types of functional arrangements that may be employed to implement the operation of portions of the search engine 127 and/or the electronic commerce application 124 as described herein. As an alternative, the flowchart of FIG. 5 may be viewed as depicting an example of elements of a method implemented in the computing environment 303 (FIG. 3) according to one or more embodiments.

Beginning with box 503, the search engine 127 receives a search query 112 from the electronic commerce application 124. For example, a client device 121 interacting with the electronic commerce application 124 may provide a search query 112 through one or more interactions with a user interface 103 of the electronic commerce application 124. Upon receiving the search query 112, the electronic commerce application 124 sends a search results request to the search engine 127 and the search results request includes the search query 112.

At box 506, the search engine 127 obtains a first set of supplemental content data 118a associated with the search query 112. In various examples, the first set of supplemental content data 118a is obtained in response to applying one or more relevancy algorithms to the supplemental content included in the supplemental content library 133. For example, one or more item categories associated with the search query 112 are determined and relevancy algorithms are applied to the supplemental content library 133 according to the item categories and the first set of supplemental content data 118 is obtained.

At box 509, the search engine 127 obtains a second set of supplemental content data 118b according to the search query mapped data 136. For example, the search engine 127 retrieves the search query mapped data 136 and matches the search query 112 with a search query 112 included in the search query mapped data 136. In some examples, the search query 112 is an exact match. In other examples, the search query 112 is determined to match a search query 112 in the search query mapped data 136 when a threshold number of terms match. In some examples, a search query 112 is determined to match if one or more terms are synonymous with one another.

Once a search query match is determined, the search engine 127 identifies the supplemental content identifiers 134 that are associated with the matching search query 112. The search engine 127 obtains the corresponding supplemental content data 118b (e.g., the second set of supplemental content data 118b) from the supplemental content library 133 based at least in part on the supplemental content identifiers 134.

At box 512, the search engine 127 selects a subset of supplemental content from the first set of supplemental content data 118a and the second set of supplemental content data 118b. In various examples, the subset of supplemental content is selected based at least in part of a likelihood a user will interact with the supplemental content listing 109, a relevance between the supplemental content and a search query 112, a category data of the supplemental content, supplemental content data 118, user preference data, user historical data, agreements between the supplemental content entity and the content provider (e.g., electronic commerce system), and/or other factors as can be appreciated.

At box 515, the search engine 127 determines one or more item listings 106 based at least on the search query 112. In particular, the search engine 127 analyzes item data 130 retrieved from an item catalog 115 to select the item listings 106 to include in the search results. In various examples, the item listings 106 are selected based at least in part on the search query 112, user data 315 (e.g., user preferences, interaction history data 324, user location, etc.), item data 130 (e.g., attributes, item categories, etc.), relevancy algorithms, and/or other factors that can be used to select item listings 106 from the item catalog 115.

At box 518, the electronic commerce application 124 receives the search results and supplemental content data 118 from the search engine 127 and generates a search results page or user interface 103 including the one or more item listings 106 and the supplemental content listings 109 corresponding to the subset of supplemental content selected in box 512. According to various embodiments, the item listings 106 and supplemental content listings 109 are arranged according to the likelihood that the user will purchase or click on an item listing 106 or supplemental content listing 109 based at least in part on user preferences and/or other factors.

At box 521, the electronic commerce application 124 causes the user interface 103 to be rendered on the client device 121. In one or more examples, the electronic commerce application 124 transmits user interface code that is executable by the client application 330 (FIG. 3) to generate and render the user interface 103 on the client device 121. In other examples, the electronic commerce application 124 transmits the generated user interface 103 to the client device 121 for rendering. For example, the electronic commerce application 124 sends data associated with the generated user interface 103 in response to an application programming interface (API) call from the client application 330. Thereafter, this portion of the process proceeds to completion.

Figure 6:
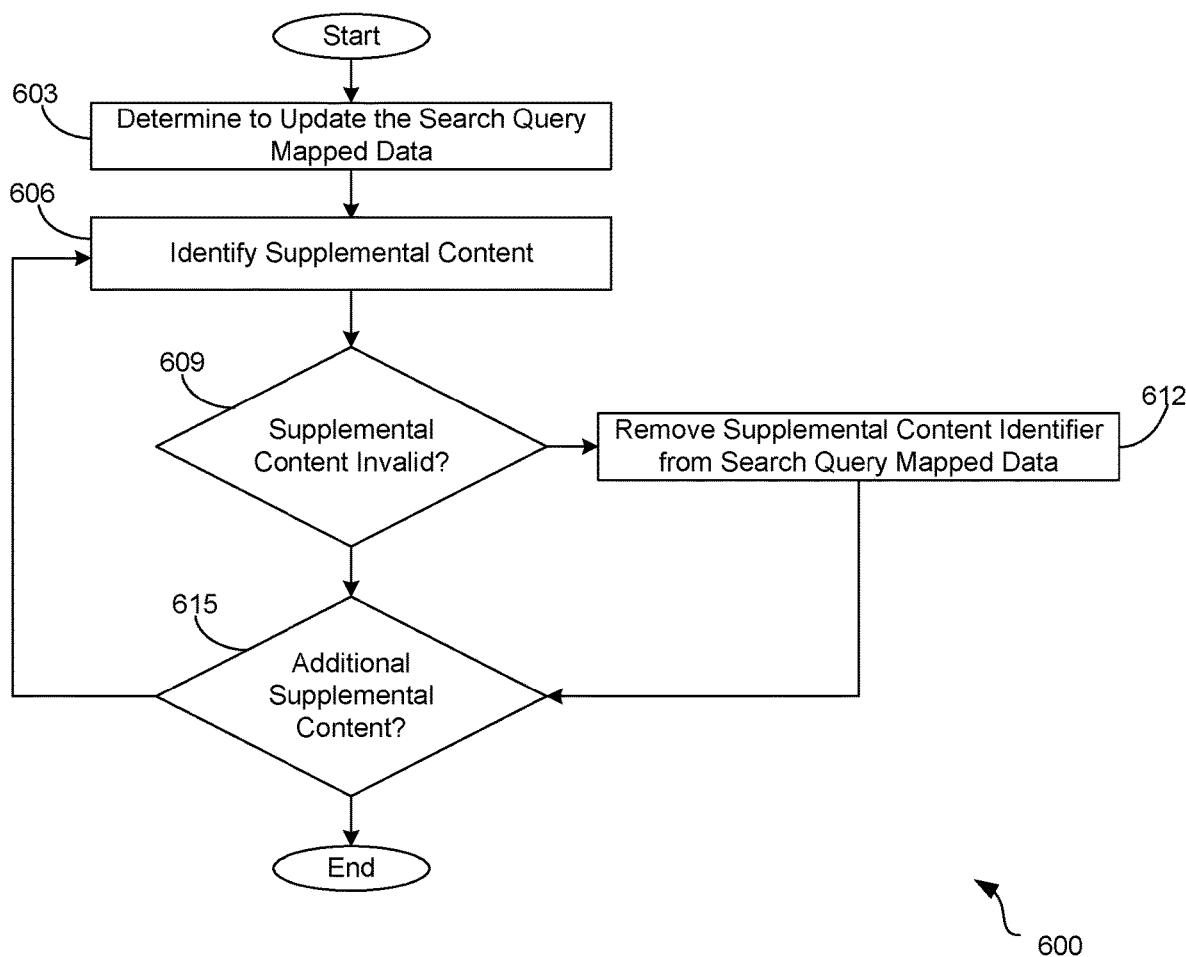

Referring next to FIG. 6, shown is a flowchart 600 that provides one example of the operation of a portion of the mapping engine 312 according to various embodiments. It is understood that the flowchart of FIG. 6 provides merely an example of the many different types of functional arrangements that may be employed to implement the operation of the portion of the mapping engine 312 as described herein. As an alternative, the flowchart of FIG. 6 may be viewed as depicting an example of elements of a method implemented in the computing environment 303 (FIG. 3) according to one or more embodiments.

Beginning with box 603, the mapping engine 312 determines to update the search query mapped data 136. In particular, the supplemental content referenced in the search query mapped data 136 corresponds to recently added or cold-sourced supplemental content. In various examples, the search query mapped data 136 is updated to replace any invalid supplemental content (e.g., removed content, content that is no longer considered recent, content that has been sourced a number of times that meets or exceeds a threshold, etc.) and/or invalid search queries 112 (e.g., no longer relevant for a given item category). According to various embodiments, the mapping engine 312 is updated periodically (e.g., monthly, weekly, daily, hourly, etc.), randomly, upon an identification of a threshold number of invalid entries, and/or other factors. In some examples, the mapping engine 312 clears the search query mapped data 136 or otherwise flushes the cache storing the search query mapped data 136 and generates an updated search query mapped data 136 according to the method described in FIG. 4. FIG. 6 relates to an example where the entries in the search query mapped data 136 are analyzed to determine validity of a given supplemental content referenced by the search query mapped data 136.

At box 606, the mapping engine 312 identifies a given supplemental content referenced in the search query mapped data 136. In various examples, the given supplemental content is identified according to an order of location for a given supplemental content identifier 134 in the search query mapped data 136, a given search query, randomly, and/or other ways of identifying the given supplemental content as can be appreciated.

At box 609, the mapping engine 312 determines whether the given supplemental content is invalid. Supplemental content is invalid when the supplemental content is no longer considered recent, is no longer available, has been sourced (e.g., selected for consideration) a threshold number of times, and/or other factors. According to various examples, the mapping engine 312 uses the supplemental content identifier 134 included in the search query mapped data 136 to identify and analyze the supplemental content data 118 in the supplemental content library 133. If the supplemental content is determined to be invalid, the mapping engine proceeds to box 612. Otherwise, the mapping engine 312 proceeds to box 615.

At box 612, the mapping engine 312 removes reference to the supplemental content by removing the supplemental content identifier 134 from the search query mapped data 136. If there are multiple references to the supplemental content identifier 134 (e.g., mapped to multiple search queries 112, the multiple references are removed from the search query mapped data 136.

At box 615, the mapping engine 312 determines whether there is additional supplemental content referenced in the search query mapped data 136 to be considered. If there is additional supplemental content, the process returns to box 606. Otherwise, this portion of the process proceeds to completion.

Figure 7:
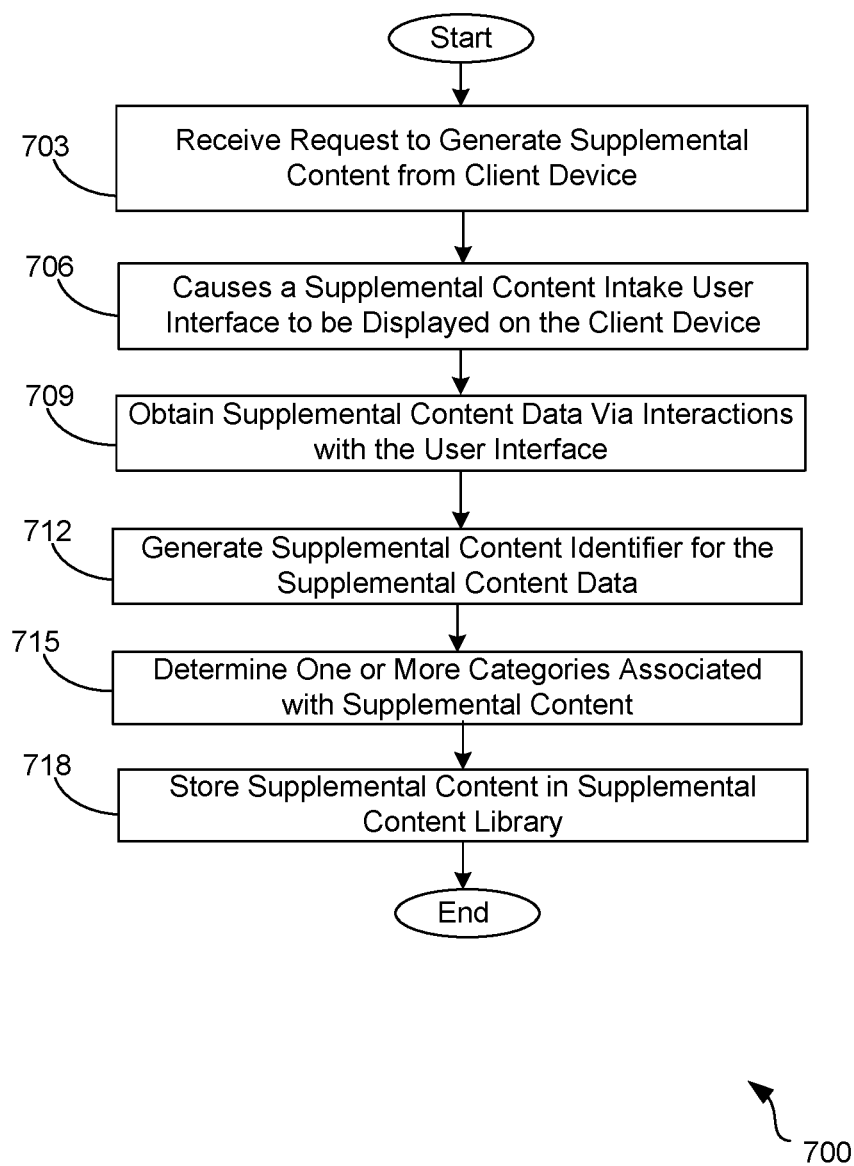

Moving on to FIG. 7, shown is a flowchart 700 that provides one example of the operation of a portion of the electronic commerce application 124 according to various embodiments. It is understood that the flowchart of FIG. 7 provides merely an example of the many different types of functional arrangements that may be employed to implement the operation of the portion of the electronic commerce application 124 as described herein. As an alternative, the flowchart of FIG. 7 may be viewed as depicting an example of elements of a method implemented in the computing environment 303 (FIG. 3) according to one or more embodiments.

FIG. 7 relates to the creation of supplemental content by third-party entities. For example, a third-party entity may wish to advertise items available via the electronic commerce site in the form of supplemental content. In some examples, the supplemental content listings 109 correspond to sponsored item listings that the third-party entity would like to be presented to targeted users.

Beginning with box 703, the electronic commerce application 124 receives a request to generate supplemental content from a client device 121 interacting with one or more user interfaces 103 of the electronic commerce application 124. In various examples, a third-party entity comprises a merchant selling one or more items via the electronic commerce site associated with the electronic commerce application 124. As such, the third-party entity may wish to promote or advertise the items to users interacting with the electronic commerce application 124.

At box 706, the electronic commerce application 124 causes a supplemental content intake user interface 103 to be displayed on the client device 121. The supplemental content intake user interface 103 comprises a user interface with components that upon selection or input allow a third-party entity to define supplemental content data 118 for supplemental content they wish to be presented to users interacting with the electronic commerce application 124. In one or more examples, the electronic commerce application 124 transmits user interface code that is executable by the client application 330 (FIG. 3) to generate and render the supplemental content intake user interface 103 on the client device 121. In other examples, the electronic commerce application 124 transmits a pre-generated supplemental content intake user interface 103 to the client device 121 for rendering. For example, the electronic commerce application 124 sends data associated with the generated supplemental content intake user interface 103 in response to an application programming interface (API) call from the client application 330.

At box 709, the electronic commerce application 124 obtains supplemental content data 118 via one or more user interactions with the supplemental content intake user interface 103. According to various examples, the supplemental content data 118 comprise supplemental content listing data, an associated item, one or more item categories associated with the supplemental content, an identification supplemental content entity promoting the supplemental content, and/or other supplemental content data.

At box 712, the electronic commerce application 124 generates a supplemental content identifier 134 to associate with the supplemental content data 118 used to generate the supplemental content. According to various embodiments, the supplemental content identifier 134 comprises a numeric, alphanumeric, or other unique identifier used to distinguish given supplemental content from other supplemental content.

At box 715, the electronic commerce application 124 determines one or more categories associated with the supplemental content. In some examples, the third-party entity defines the one or more item categories via interactions with the supplemental content intake user interface 103. In other examples, the electronic commerce application 124 identifies one or more item categories based at least in part on item data 130 for an item associated with the supplemental content. For example, if the supplemental content corresponds to a promotion of Item A and the item data for Item A indicates that Item A is associated with Category B and Category C, then the electronic commerce application 124 determines that Category B and Category C are associated with the supplemental content.

At box 718, the electronic commerce application 124 stores the supplemental content data 118 in the supplemental content library 133. In some examples, the supplemental content data 118 is stored in the supplemental content library 133 according to the supplemental content identifier 134. Thereafter, this portion of the process proceeds to completion.

Figure 8:
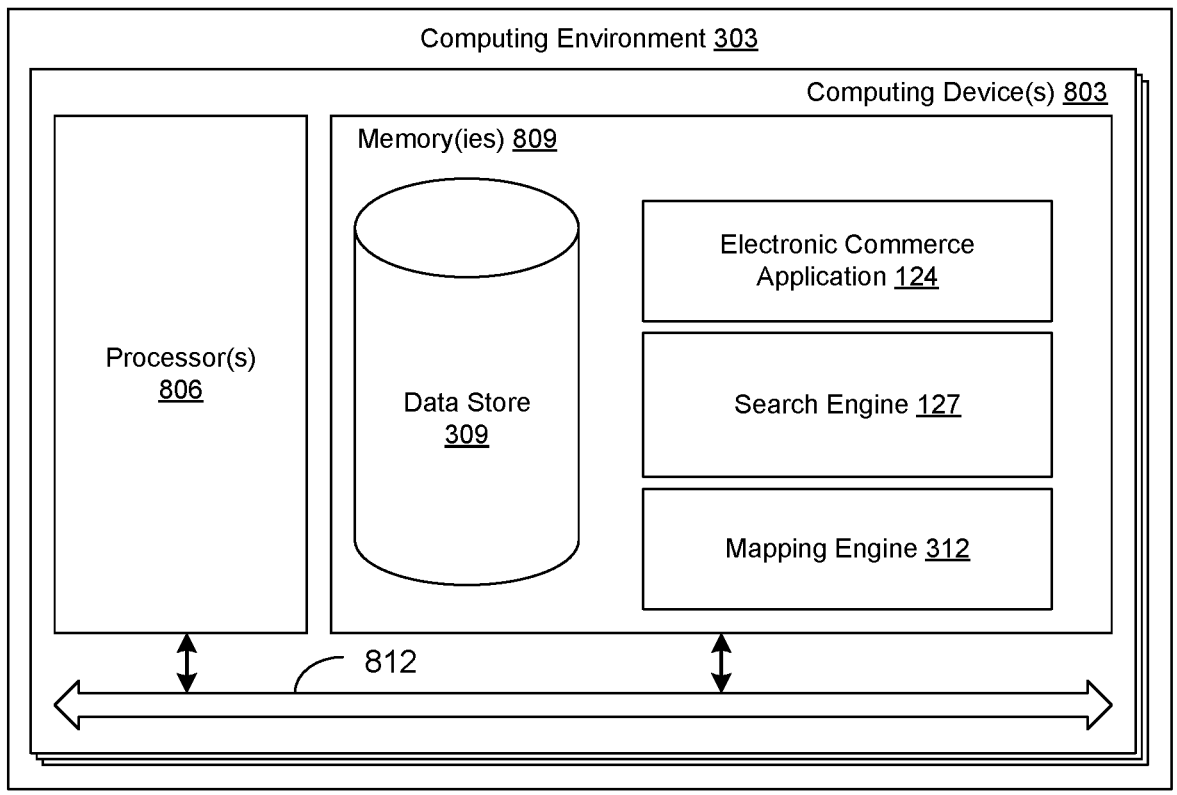
FIG. 8 is a schematic block diagram that provides one example illustration of a computing environment employed in the networked environment of FIG. 3 according to various embodiments of the present disclosure.

With reference to FIG. 8, shown is a schematic block diagram of the computing environment 303 according to an embodiment of the present disclosure. The computing environment 303 includes one or more computing devices 803. Each computing device 803 includes at least one processor circuit, for example, having a processor 806 and a memory

809, both of which are coupled to a local interface 812. To this end, each computing device 803 may comprise, for example, at least one server computer or like device. The local interface 812 may comprise, for example, a data bus with an accompanying address/control bus or other bus structure as can be appreciated.

Stored in the memory 809 are both data and several components that are executable by the processor 806. In particular, stored in the memory 809 and executable by the processor 806 are an electronic commerce application 124, a search engine 127, a mapping engine 312, and potentially other applications. Also stored in the memory 809 may be a data store 309 and other data. In addition, an operating system may be stored in the memory 809 and executable by the processor 806.

It is understood that there may be other applications that are stored in the memory 809 and are executable by the processor 806 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 809 and are executable by the processor 806. In this respect, the term "executable" means a program file that is in a form that can ultimately be run by the processor 806. Examples of executable programs may be, for example, a compiled program that can be translated into machine code in a format that can be loaded into a random access portion of the memory 809 and run by the processor 806, source code that may be expressed in proper format such as object code that is capable of being loaded into a random access portion of the memory 809 and executed by the processor 806, or source code that may be interpreted by another executable program to generate instructions in a random access portion of the memory 809 to be executed by the processor 806, etc. An executable program may be stored in any portion or component of the memory 809 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 809 is defined herein as including both volatile and nonvolatile memory and data storage components. Volatile components are those that do not retain data values upon loss of power. Nonvolatile components are those that retain data upon a loss of power. Thus, the memory 809 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 806 may represent multiple processors 806 and/or multiple processor cores and the memory 809 may represent multiple memories 809 that operate in parallel processing circuits, respectively. In such a case, the local interface 812 may be an appropriate network that facilitates communication between any two of the multiple processors 806, between any processor 806 and any of the memories 809, or between any two of the memories 809, etc. The local interface 812 may comprise additional systems designed to coordinate this communication, including, for example, performing load balancing. The processor 806 may be of electrical or of some other available construction.

Although the electronic commerce application 124, the search engine 127, the mapping engine 312, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-7 show the functionality and operation of an implementation of portions of the electronic commerce application 124, the search engine 127, and/or the mapping engine 312. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 806 in a computer system or other system. The machine code may be converted from the source code, etc. If embodied in hardware, each block may represent a circuit or a number of interconnected circuits to implement the specified logical function(s).

Although the flowcharts of FIGS. 4-7 show a specific order of execution, it is understood that the order of execution may differ from that which is depicted. For example, the order of execution of two or more blocks may be scrambled relative to the order shown. Also, two or more blocks shown in succession in FIGS. 4-7 may be executed concurrently or with partial concurrence. Further, in some embodiments, one or more of the blocks shown in FIGS. 4-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 124, the search engine 127, and the mapping engine 312, that comprises software or code can be embodied in any non-transitory computer-readable medium for use by or in connection with an instruction execution system such as, for example, a processor 806 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce application 124, the search engine 127, and the mapping engine 312, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 803, or in multiple computing devices 803 in the same computing environment 303.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
at least one computing device; and
at least one application executable by the at least one computing device, wherein, when executed, the at least one application causes the at least one computing device to at least:
identify a subset of supplemental content from a supplemental content library based at least in part on a date of creation associated with the subset of supplemental content;
build search query mapped data by:
for individual supplemental content included in the subset of supplemental content, identify at least one respective item category associated with the individual supplemental content based at least in part on one or more keywords in the supplemental content;
generate a first mapping associating the individual supplemental content of the subset of supplemental content with the at least one respective item category;
for individual item categories of a plurality of item categories, identify at least one respective category-related search query associated with the individual item categories;
generate a second mapping associating the individual supplemental content with the at least one respective category-related search query based at least in part on the first mapping and the at least one respective category-related search query, and the individual item categories, the search query mapped data comprising the second mapping;
store the search query mapped data in a cache;
receive a request from a client device for a search results page via one or more user interactions with a user interface of an electronic commerce application, the request including a user-specified search query;
retrieve a first portion of supplemental content from the supplemental content library;
identify one or more supplemental content identifiers for a second portion of supplemental content from the search query mapped data, the one or more supplemental content identifiers being identified based at least in part on the user-specified search query;
retrieve the second portion of supplemental content from the supplemental content library based at least in part on the one or more supplemental content identifiers;
determine at least one supplemental content listing to include in the search results page based at least in part on the first portion of supplemental content, the second portion of supplemental content, and a likelihood of a user of the client device interacting with the supplemental content;
generate a search results page including the at least one supplemental content listing and at least one item listing; and
transmit the search results page to the client device.

2. The system of claim 1, wherein, when executed, the at least one application further causes the at least one computing device to at least:
receive supplemental content data from a third-party entity client device in response to interactions with a supplemental content intake user interface; and
create an additional supplemental content based at least in part on the supplemental content data.

3. The system of claim 2, wherein the supplemental content data comprises at least one of: the date of creation, a supplemental content identifier, a third-party entity identifier, a date of expiration of a respective supplemental content, an item category list of corresponding item categories, or supplemental content listing data defining a respective supplemental content listing.

4. The system of claim 1, wherein, when executed, the at least one application further causes the at least one computing device to at least:
determine that the cache requires an update; and
update the cache based at least in part on a selection of a second portion of supplemental content from the supplemental content library, the selection being based at least in part on the date of creation of the second portion of supplemental content.

5. A method, comprising:
identifying, via at least one computing device, a supplemental content item from a plurality of supplemental content items;
determining, via the at least one computing device, one or more item categories associated with supplemental content item based at least in part on one or more keywords included in supplemental content data of the supplemental content item;
identifying, via the at least one computing device, one or more search queries associated with the one or more item categories;
generating, via the at least one computing device, a mapping associating the supplemental content item with the one or more search queries; and
selecting, via the at least one computing device, the supplemental content item based at least in part on the mapping and a given search query; and
determining, via the at least one computing device, to update the mapping based at least in part on a predetermined amount of time.

6. The method of claim 5, wherein determining the one or more item categories is based at least in part on an analysis of the supplemental content data associated with the supplemental content item.

7. The method of claim 5, further comprising storing the mapping in a cache.

8. The method of claim 5, further comprising:
determining, by the at least one computing device, that the mapping needs to be updated based at least in part on a date of creation of one or more supplemental content item; and
updating, by the at least one computing device, the mapping by disassociating the at least one supplemental content item with the one or more search queries.

9. The method of claim 5, wherein the mapping is generated by associating a supplemental content identifier of the supplemental content item with the one or more search queries.

10. The method of claim 5, further comprising:
generating, via the at least one computing device, a user interface configured to receive supplemental content data;
transmitting, via the at least one computing device, the user interface to a third-party client device; and
receiving, via the at least one computing device, the supplemental content data via one or more interactions with the user interface.

11. The method of claim 5, further comprising receiving, via the at least one computing device, a search results request comprising the given search query, the search results request being received via one or more interactions with a user interface.

12. The method of claim 11, wherein the supplemental content item is one of a first portion of supplemental content items, and further comprising:
selecting, via the at least one computing device, a second portion of supplemental content items from the plurality of supplemental content items;
identifying, via the at least one computing device, the supplemental content item from an analysis of the second portion of supplemental content items and the first portion of supplemental content items; and
generating, via the at least one computing device, a search results page including a supplemental content listing corresponding to the supplemental content item in response to receiving the search results request.

13. A system, comprising:
at least one computing device; and
at least one application executable in the at least one computing device, wherein when executed the at least one application causes the at least one computing device to at least:
receive supplemental content data from a third-party entity client device via one or more interactions with a supplemental content intake user interface, the supplemental content data defining an item to be considered for display on an electronic commerce user interface, and the supplemental content data may include one or more supplemental content keywords associated with the item;
identify one or more item categories for the item based at least in part on the one or more supplemental content keywords;
map the supplemental content data to at least one search query associated with the one or more item categories identified for the supplemental content;
receive a search query from a user client device associated with a user interacting with an electronic commerce application;
identify the supplemental content data based at least in part on the mapping of the search query to the one or more item categories that are identified for the supplemental content and a likelihood of a user of the user client device interacting with the supplemental content; and
generate the electronic commerce user interface including the supplemental content and one or more item listings associated with a given item category of the one or more item categories.

14. The system of claim 13, wherein, when executed, the at least one application causes the at least one computing device to at least select the supplemental content data from a supplemental content library based at least in part on a date of creation of the supplemental content data.

15. The system of claim 14, wherein the supplemental content data is associated with the at least one search query following selection of the supplemental content data from the supplemental content library.

16. The system of claim 14, wherein the supplemental content data comprises at least one of: the date of creation, a supplemental content identifier, a third-party entity identifier, a date of expiration of a respective supplemental content, an item category list of corresponding item categories, or supplemental content listing data defining a respective supplemental content listing.

17. The system of claim 13, wherein associating the supplemental content data to the at least one search query further comprises mapping an identifier of the supplemental content data with the at least one search query.

18. The system of claim 13, wherein the supplemental content is one of a plurality of supplemental content included on the electronic commerce user interface, and a first subset of the plurality of supplemental content being mapped to the search query and a second subset of the plurality of supplemental content failing to be mapped to the user-submitted search query.

19. The system of claim 13, wherein an amount of historical interaction data associated with the supplemental content fails to meet a historical interaction threshold.

20. The system of claim 13, wherein, when executed, the at least one application further causes the at least one computing device to at least:
- determine the given item category based at least in part on one or more search terms in the search query; and
- generating search results including the one or more item listings based at least in part on the given item category.

* * * * *